Sept. 13, 1949.  O. A. BECKER  2,481,489
FILTER
Filed May 16, 1945

INVENTOR.
OTTO A. BECKER
BY
William D. Hall
ATTORNEY

Patented Sept. 13, 1949

2,481,489

UNITED STATES PATENT OFFICE 2,481,489

FILTER

Otto A. Becker, Long Branch, N. J., assignor to the United States of America as represented by the Secretary of War Application May 16, 1945, Serial No. 594,150

1 Claim. (Cl. 210—131)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in filters.

In filtering foreign materials from certain liquids, it has been found that solid particles in the liquids have a tendency to rapidly clog up the filtering means so as to require frequent changes thereof.

It is, therefore, an object of the present invention to provide a filtering device which is not subject to rapid clogging by solid matter.

It is another object to provide a filtering device of the cartridge type, in which the cartridge may be so inexpensively constructed that it may be thrown away and replaced when it has outlived its usefulness.

It is a further object to provide a filtering device wherein a large portion of the solid particles filtered out of the liquid do not pass through the filtering material so as to clog it.

The present invention resides generally in a filter which is provided with a relatively deep well into which the liquid flows and wherein most of the larger and heavier solid particles may be settled out before the liquid flows off to pass through a suitable filtering material to catch any foreign matter not settled out in the well.

For a better understanding of the invention, together with other and further objects thereof, reference is had to the following description taken in connection with the accompanying drawings and its scope will be pointed out in the appended claims.

Figure 1:
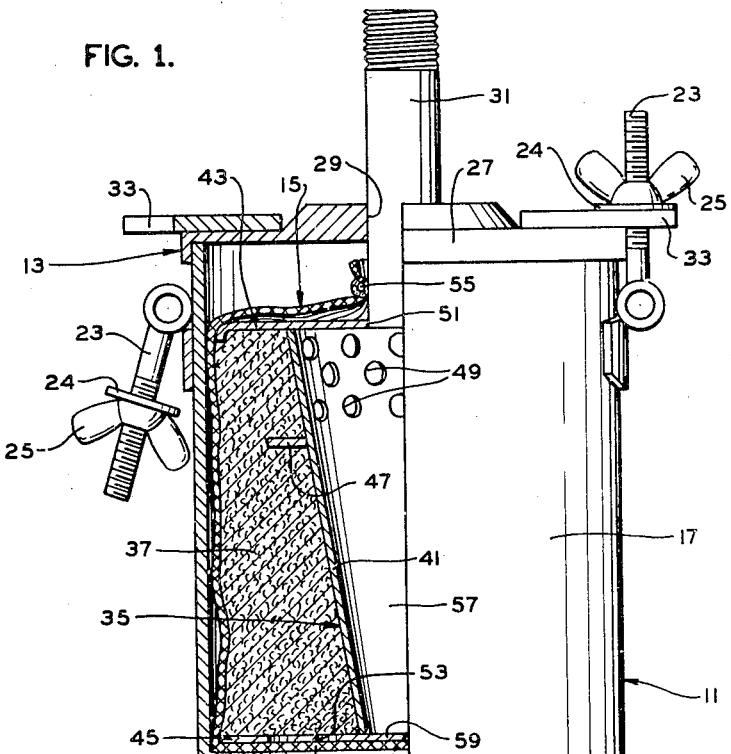
Figure 2:
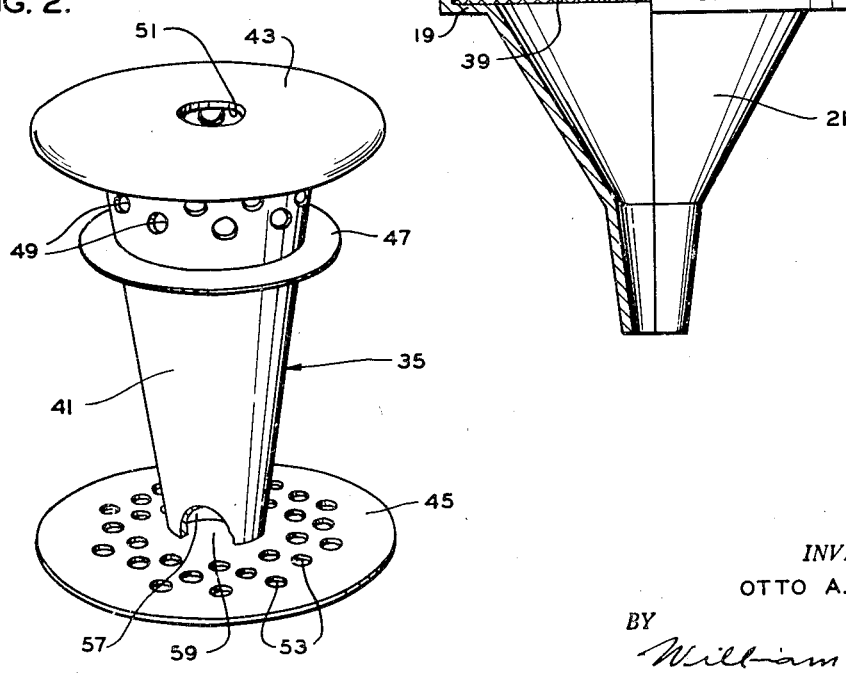

In the drawings, Figure 1 is an elevational view, the left half being shown in section, of a filter embodying the present invention, and Figure 2 is a perspective view of the metal support of the filtering cartridge of Figure 1.

The filter, shown in the drawings, comprises as its main components a funnel-like container 11, a cover 13 for said container, and a replaceable filter cartridge 15.

The container 11 is made up of a vertically disposed, hollow, cylindrical body portion 17 provided, at its lower end, with an inwardly extending annular flange 19 which supports the cartridge 15, and a downwardly extending funnel 21 which is secured to the inner periphery of said flange 19. Said container 11 is provided, on opposite sides, with a pair of pivotable bolts 23, washers 24 and wing nuts 25.

The cover 13 for said container 11 comprises a circular cap 27 adapted to fit over and close the upper open end of said container 11. The center of said cap 27 is pierced by an aperture 29 in which aperture there is rigidly secured a coaxially disposed hollow pipe 31. Said pipe 31 may be threaded at its upper end to allow the attachment thereto of a flexible hose (not shown) through which may be fed the liquid which is to be filtered. The said cover 13 is also fitted, on opposite sides, with a pair of slotted ears 33, extending outwardly horizontally from said cover, to accommodate the bolts 23 aforementioned.

The replaceable cartridge 15 comprises a support 35, a mass of filtering material 37 and a bag 39.

The support 35 (shown separately in Figure 2) may be made of sheet metal, plastic or any other suitable material. It includes a vertically disposed, central, hollow core 41. Said core is in the shape of an inverted, truncated cone. Secured to its upper and lower ends, as by soldering (if the support is of metal), are horizontally disposed top and base plates 43, 45. Said top and base plates 43, 45 are circular and are of a slightly lesser diameter than the inside of the cylindrical body 17 of the container 11 and the periphery of the top plate 43 is preferably rounded downwardly. Secured to the outside of the core 41, as by soldering, intermediate the top and base plates 43, 45, preferably a short distance below the top plate 43, is a horizontally disposed, annular baffle plate 47, which is of lesser outside diameter than the top and base plates 43, 45.

The core 41, above the level of the baffle plate 47, is pierced by a plurality of perforations 49. The top plate 43 is pierced by a single, centrally positioned aperture 51 of a size to be receivable to the lower end of the pipe 31. The central portion 59 of the base plate 45 acts as a closure for the lower end of the core 41, but said base plate is pierced by a plurality of apertures 53 in that portion of it which extends laterally beyond the lower end of the core 41.

It will thus be seen that the portion of the core 41 below the perforations 49 together with the central portion 59 of the base plate 45 form a leak-proof well 57, open at the top, for the use which will be made clear hereinafter.

The space between the top plate 43 and the base plate 45, and outside the core 41, is packed with a suitable filtering material 37, such as absorbent cotton, and the support 35 described above and the filtering material 37 are enclosed in a bag 39, of fabric or the like, which is gathered together at its upper end by a draw string 55.

In the use of the filter just described, a hose (not shown) carrying the liquid, may be threadably fastened to the upper end of the pipe 31. The liquid will then flow downwardly into the core 41 until the level of said liquid reaches the perforations 49, whereupon it will flow through said perforations and into the filtering material 37. The well 57 acts as a settling basin wherein solid particles in the liquid may be allowed to settle. The liquid, which overflows from the well 57 into the filtering material 37, must then flow outside the baffle plate 47 and, hence, can not run down on the outside of the core 41 and thereby avoid passing through the said filtering material. After said liquid has flown through the filtering material 37 it flows through the fabric of the bag 39 and downward through the funnel 21. The material of the filtering material 37 and of the bag 39 may be such as to slow down the speed of flow of liquid to the best working speed of flow.

It will thus be seen that a good portion of the solid particles contained in the liquid being filtered will settle to the bottom of the well 57, the liquid being slowed up in passing through the filtering material 37, and, hence, only a limited amount of solid matter will reach the filtering material, thereby extending the useful life of said filtering material long beyond that which is usual in many other filters. However, when the well 57 and filtering material 37 finally become clogged with solid particles, the cover 13 may be removed and the entire cartridge 15 readily replaced.

While there has been described what, at present, is considered a preferred embodiment of the present invention, it will be obvious to those skilled in the art that various changes and modifications may be made therein without departing from the invention.

What is claimed is:

A filter comprising a funnel-like container provided with an inlet pipe at the top and an outlet port at the bottom; a filter cartridge adapted to fit into said container; said cartridge comprising a support, a quantity of filtering material, and a bag; the said support comprising a central, vertically disposed, hollow tubular core pierced by openings at its upper portion, a horizontally disposed top plate secured to the upper end of said core and pierced by an opening receivable to the inlet pipe aforesaid, a horizontally disposed base plate in register with the top plate and secured to the lower end of the said core so that its central portion forms, with the lower portion of the core, a settling basin, said base plate also extending laterally beyond said core, the portion of said base plate extending beyond said core being pierced by holes so positioned that liquid passing through them flows into the said outlet pipe; a horizontally disposed annular baffle plate secured to the outside of the core below the openings in said core aforementioned; the filtering material filling the space outside the core and between the top and base plates; the bag aforesaid surrounding the support and filtering material and being provided with an aperture receivable to the inlet pipe.

OTTO A. BECKER.

REFERENCES CITED

The following references are of record in the file of this patent:

UNITED STATES PATENTS

| Number | Name | Date |
|---|---|---|
| 999,759 | Dondey et al. | Aug. 8, 1911 |
| 1,723,374 | Roehr | Aug. 6, 1929 |
| 2,043,781 | Sorenson et al. | June 9, 1936 |
| 2,097,828 | Baldwin | Nov. 2, 1937 |
| 2,168,125 | Hurn | Aug. 1, 1939 |
| 2,188,745 | Wagner | Jan. 30, 1940 |
| 2,327,011 | Bolser | Aug. 17, 1943 |
| 2,348,651 | Schelly | May 9, 1944 |

FOREIGN PATENTS

| Number | Country | Date |
|---|---|---|
| 200,054 | Switzerland | Jan. 16, 1939 |